United States Patent Office 2,701,437
Patented Feb. 8, 1955

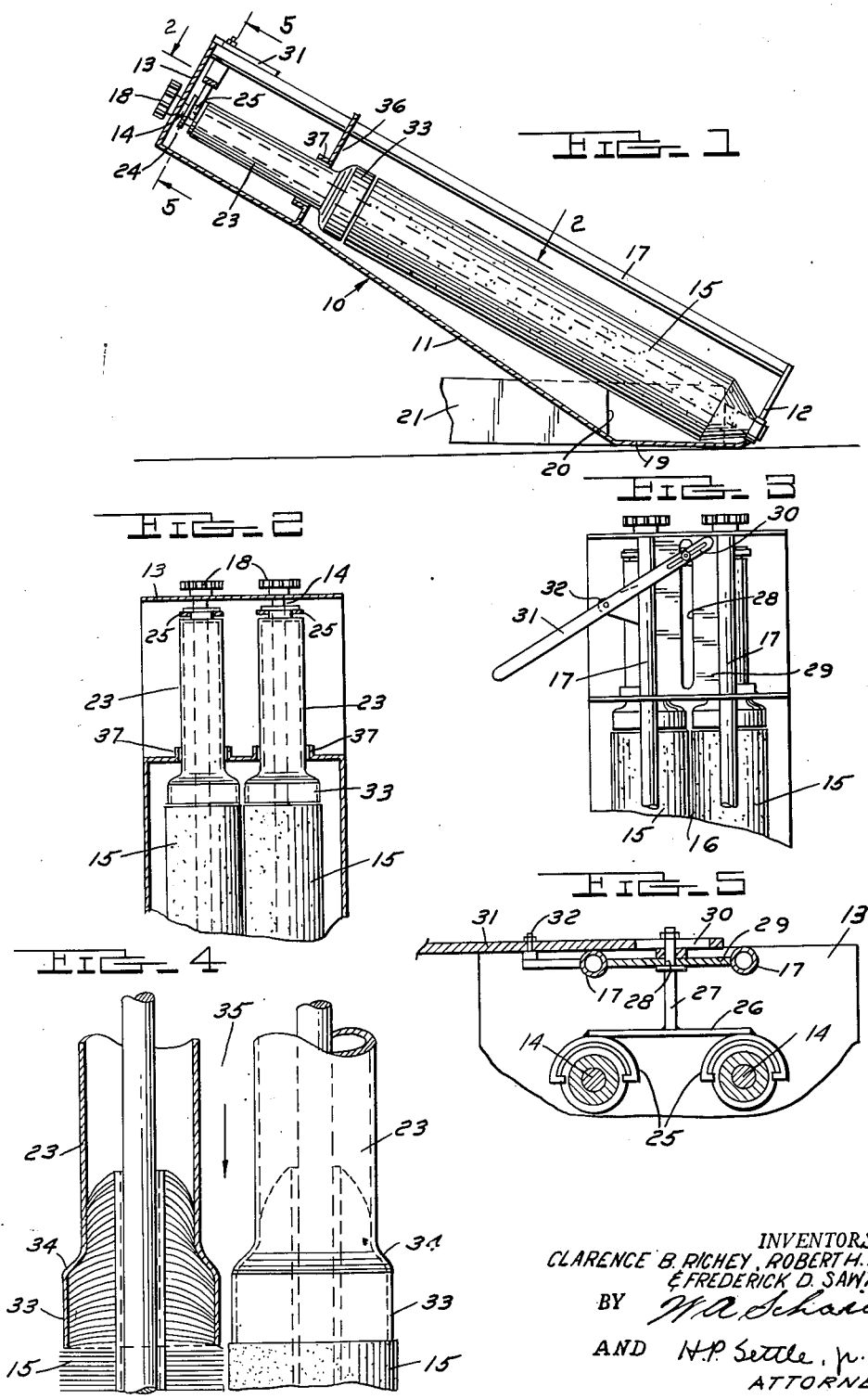

2,701,437

CROP STRIPPING MEANS

Clarence B. Richey and Robert H. Witt, Royal Oak, and Frederick D. Sawyer, Birmingham, Mich., assignors, by mesne assignments, to Ford Motor Company, Dearborn, Mich., a corporation of Delaware Application May 5, 1952, Serial No. 286,112

4 Claims. (Cl. 56—33)

The present invention relates to a crop stripping means and more particularly to means for shielding a portion of a crop stripping element for a harvesting machine.

In the harvesting of cotton and similar crops, it has been suggested that the desired crop be stripped from the associated plant by the subjection of the plant to the stripping action of a pair of counterrotating stripping elements defining a nip therebetween, the nip being coextensive with the stripping elements. Preferably, the stripping elements take the form of elongated axially parallel bristle brushes which are effective to remove the desired crop. Due to the nature of the growing cycle of the cotton plant, a serious problem has arisen due to the undesirability of harvesting the crop from the entire plant at any given time, since the crop at the lower portions of the plant matures earlier than the crop at the upper plant portions. Consequently, if the crop is harvested so as to obtain the most desirable cotton from the lower portions of the plant, many green bolls and immature cotton from the plant upper portions is also stripped by the elements.

The present invention now provides means for confining the stripping action of the harvesting elements to only the lowermost portions of the plant so that the harvesting of immature portions of the crop is prevented. More specifically, the present invention comprises a shielding mechanism which is actuatable to enclose and render ineffective upper portions of the crop stripping elements, thereby limiting the extent of the stripping nip. The shield is axially movable relative to the brush from an effective shielding position to an inoperative position at which the entire length of the brush may be utilized, so as to harvest the upper portions of the crop. If merely a stationary shield were employed, it will be appreciated that serious wear of the brush could result, so the shields of the present invention are rotatable with the brushes and are provided with actuating means operable independently of rotation of the shields and/or the brushes.

It is, therefore, an important object of the present invention to provide an improved crop stripping means whereby a selected portion of a crop stripping element is shielded so as to prevent the harvesting of a portion of the crop subjected to the element.

Another important object is the provision of an improved crop stripping mechanism having a pair of laterally spaced counterrotatable stripping brushes defining a stripping nip and shields telescopically engageable with the brushes, respectively, to prevent the subjection of a selected portion of the crop to the stripping action of the brushes, the lateral space between portions of the shields engaging the brushes being greater than the lateral dimensions of the stripping nip.

It is a further object to provide a shield for a rotatable crop stripping element, the shield being adapted to be telescoped over a selected portion of the element to prevent the stripping of a crop at the element periphery, and the shield being frictionally engaged by the element periphery for corotation with the element to prevent frictional wear thereof.

Still another important object of the present invention is the provision of a shield for a crop stripping brush defining a portion of a crop stripping nip, the shield and the brush being relatively movable axially and corotatable so that shielding of the brush to limit the effective extent of the stripping nip does not cause wear of the brush by virtue of its engagement with the shield.

The specific nature of this invention, as well as other objects and advantages thereof, will become apparent to those skilled in the art from the following detailed description taken in conjunction with the attached drawing on which, by way of preferred example only, is illustrated one embodiment of this invention.

On the drawing:

Figure 1 is a fragmentary side elevational view, with parts broken away and in section, of the harvesting head of a crop stripping machine provided with crop stripping elements and element shields of the present invention;

Figure 2 is a fragmentary sectional view taken along the plane 2—2 of Figure 1;

Figure 3 is a fragmentary plan view of the shields;

Figure 4 is an enlarged sectional view with parts broken away similar to Figure 2 and illustrating the shields and stripping elements in an adjusted position; and Figure 5 is a sectional view, with parts shown in elevation, taken along the plane 5—5 of Figure 1;

As shown on the drawing:

In Figure 1 reference numeral 10 refers generally to a cotton harvesting machine.

Generally, the harvesting machine comprises a harvesting head enclosed within flare sheets 11 having upwardly and forwardly projecting front and rear walls 12 and 13, respectively, journaling a pair of longitudinally extending, upwardly and rearwardly inclined stripping element spindles 14 upon which are disposed generally cylindrical stripping brushes 15. The brushes 15 are laterally spaced to define therebetween a stripping nip 16 coextensive with the brushes and effective to strip the desired crop from the associated plants. To aid in guiding the plants between the stripping brushes, there are provided a pair of rod-like plant compressors 17 generally overlying each brush, respectively, and extending longitudinally therealong. The spindles 14 are driven for rotation by suitable means, as by sprockets 18 disposed at the rear ends thereof and driven by a suitable source such as the harvester prime mover.

The crop stripped from the plants by the counterrotating brushes 15 falls within the harvesting head for collection at a lower floor wall 19 thereof and is subjected to suction at a suction inlet portion 20 defined in the flare sheets side wall and communicating with a rearwardly extending suction duct 21 connected to the intake side of a pneumatic conveyor blower.

It will be noted from Figure 1 that the spindles 14 project rearwardly beyond the brushes 15 and this additional length of the spindles is utilized for the mounting of a pair of generally cylindrical shields 23. The shields 23 carry at their rear ends a spool-type clutch collar 24 and an upwardly projecting Y-shaped clutch yoke 25 has its lower legs interposed between the spaced flanges of the collar. The yokes 25 are joined by a laterally extending arm 26 secured at its medial portion to an upstanding post 27 slidably disposed within a slot 28 formed in a split plate 29 joining the upper reaches of the plant compressor 17. The free upper end of the post 27 is pivoted within a slot 30 formed in an actuating arm 31 which in turn is medially pivoted, as at 32, to the adjacent plant compressor 17. Upon actuating the terminal free end of the arm 31, the shields 23 will be moved axially upon the spindles into and out of telescoping position over the associated brushes 15.

In order to facilitate such telescoping movement, the shields are provided with radially enlarged, generally cylindrical forward bells 33 which are of slightly smaller inside diameter than the exterior diameter of the associated brushes. Upon actuation of the shields 23 to assume their telescoped position, the resilient bristles of the brushes 15 will be deformed so as to lie snugly against the inner surface of the shields, and the resiliency of the bristles will insure corotation of the shields and brushes. The frustro-conical joining surfaces 34 connecting the main tubular portions of the shields 23 and the bell ends 33 thereof will gently compress the brush bristles so as to aid in the forward movement of the shields.

From the foregoing detailed description, it will be appreciated that the present invention thus provides an improved means for shielding axial portions of at least one of a pair of relatively rotatable stripping elements to limit the effective stripping nip defined thereby, so that no effective stripping action is obtained at at least a portion of the nip. The reduced diameter of the primary shielding portions of the shields 23 results in the provision of a secondary nip area 35 (Figure 4) between the shields, the secondary nip 35 being of substantial lateral dimension so that no effective stripping action occurs at this portion of the stripping elements. Since the brushes are counterrotatable and rotate upwardly at the brush nip, there is no tendency for the brushes to pull a plant downwardly therebetween, i. e., the brushes brush upwardly along the plant stalks. Consequently, if the shields were actuated to their position of Figure 4, the upper portions of the plant may pass freely between the shields at the non-effective secondary nip 35. Therefore there is no stripping of the upper portions of the plant, in other words, the effective nip area is limited to the lower uncovered brush portions and the cotton or other crop is removed only at the lower plant portions contacted by the uncovered brushes. If it should be desired to strip the upper portions of the plants, it is only necessary to adjust the shields to their uppermost position as shown in Figure 1 and the entire nip length of the brushes may be utilized for effective harvesting of the crop.

The possibility of selective stripping of predetermined portions of the crop by the utility of the device of the present invention to limit the stripping nip area will be appreciated and the extremely simple mechanism which the present invention provides will be obvious.

It will, of course, be understood that many details of construction may be varied through a wide range without departing from the principles of this invention and it is, therefore, not the purpose to limit the patent granted hereon otherwise than necessitated by the scope of the appended claims.

We claim:

1. In a stripper-type harvesting machine, a frame, a stripping brush carried by said frame and having a peripheral stripping surface adapted to strip a crop from a plant in juxtaposition thereto, a generally cylindrical shield carried by said frame in axial alignment with said brush and movable axially relative to said brush to telescopically enclose an axial portion of the periphery of said brush, and means engaging said shield for moving the same toward said brush to completely enclose an axial portion of the brush stripping surface.

2. In a stripper-type harvesting machine, a first stripping element rotatable about a central axis and having radial resiliently deflectable bristles defining a generally cylindrical peripheral crop-stripping surface, an additional stripping means immediately adjacent to and extending generally parallel to said first element, said first stripping element and said additional stripping element being cooperable to define a stripping nip therebetween substantially coextensive with said first element, a generally cylindrical freely rotatable shield axially aligned with said first element and having an inner diameter substantially less than the exterior diameter of said first element, and an elongated guide element slidably carrying said shield for movement axially of said first stripping element, said shield being movable to an adjusted position partially enclosing said first element at which position said shield compresses the element bristles to establish co-rotation of said shield with said first element.

3. In a stripper-type harvesting machine, a frame, a pair of spaced generally parallel stripping brushes carried by said frame and cooperably defining therebetween a stripping nip substantially coextensive with said brushes, a freely rotatable generally cylindrical shield axially aligned with each of said brushes, respectively, and of an inside diameter less than the outside diameter of the associated brush, said shields each having an enlarged open end immediately adjacent the end of the corresponding brush and a tapered reduced portion joining said open end to said shield, guiding elements carried by said frame slidably journalling said shields for axial movement towards and away from said brushes, and means for simultaneously actuating said shields for telescoping movement over the associated brushes so that the adjacent brush end is first entered in said enlarged open end and then gently folded for entry into said shield proper, with the shield proper compressing the associated brush to establish co-rotation thereof, thereby reducing brush wear upon brush-shield contact.

4. In a harvesting machine having a frame and a stripping element journalled for rotation by said frame, said stripping element having a plurality of deflectible projections defining a peripheral crop-engaging surface, a shield axially aligned with said stripping element and having an arcuately shaped covering portion, and a guide carried by said frame and supporting said shield for movement relative to said stripping element, said shield covering portion contacting said crop-engaging surface upon movement of the shield toward said element to resiliently deflect the projections thereof beneath said covering portion, so that the effective surface area of said stripping element is reduced.

References Cited in the file of this patent

UNITED STATES PATENTS 1,722,747    Hentz _____ July 30, 1929